Jan. 23, 1923.
W. C. J. GUILFORD.
DEVICE FOR REPAIRING FENDERS.
FILED MAR. 16, 1920.
1,443,075
2 SHEETS-SHEET 1
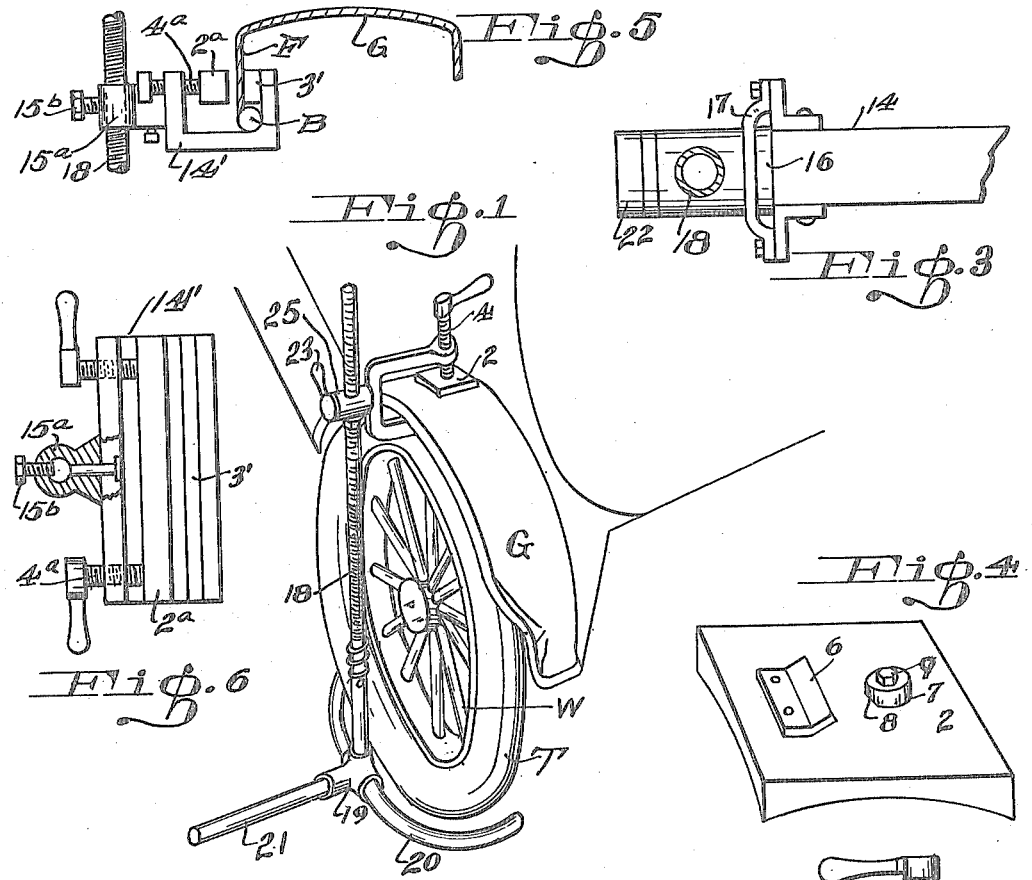
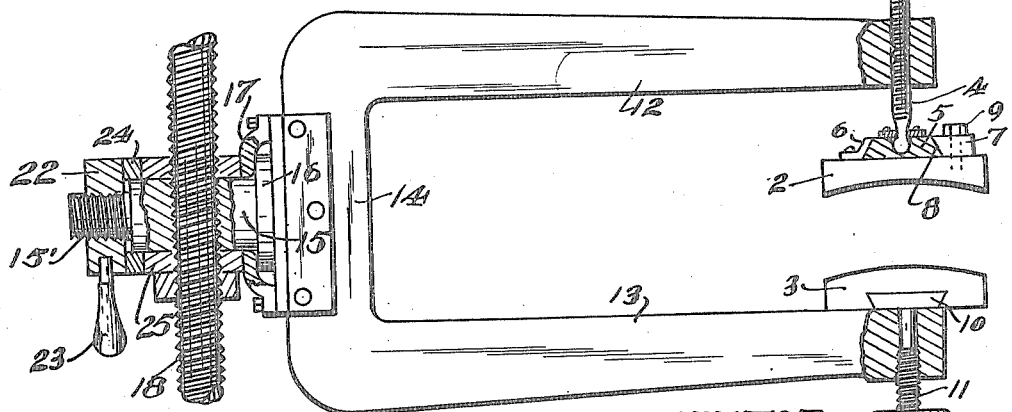
INVENTOR
William C. J. Guilford
By Hazard & Miller
ATT'YS.

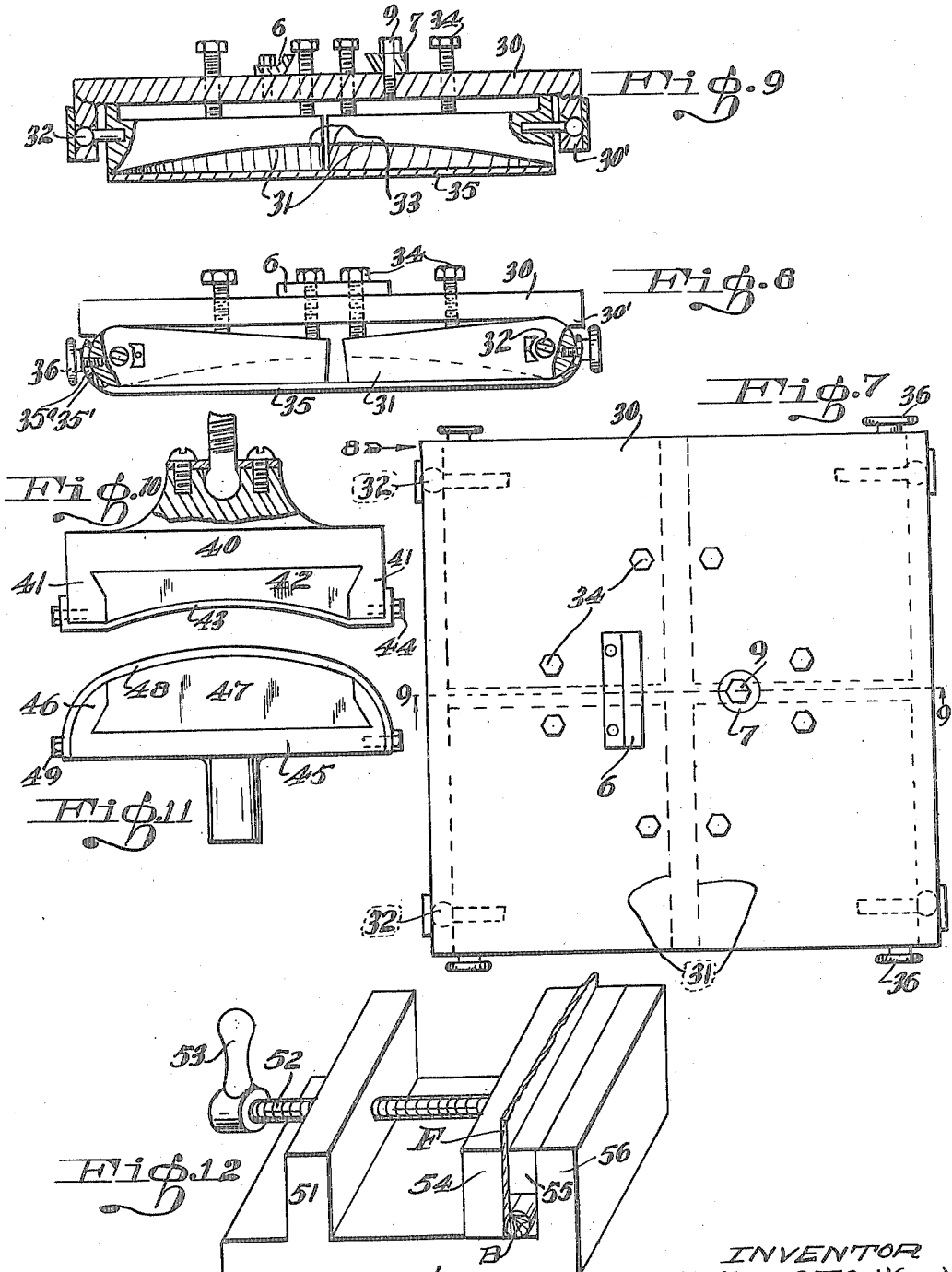

Patented Jan. 23, 1923.

1,443,075

UNITED STATES PATENT OFFICE.

WILLIAM C. J. GUILFORD, OF PASADENA, CALIFORNIA.

DEVICE FOR REPAIRING FENDERS.

Application filed March 16, 1920. Serial No. 366,352.

*To all whom it may concern:*

Be it known that I, WILLIAM C. J. GUILFORD, a citizen of the United States, residing at Pasadena, in the county of Los Angeles and State of California, have invented new and useful Improvements in Devices for Repairing Fenders, of which the following is a specification.

This invention relates to apparatus for reshaping deformed automobile and other vehicle mud guards, and has for its object to provide an apparatus of the kind that can be readily applied to mud guards on the car without necessitating the dissociation of the mud guard from the car, and the invention has for its further object to provide an apparatus of this kind that is readily adjustable to fit various contours of automobile mud guards, and the invention consists of the construction, the combination and in details and arrangements of the parts, embodiments of which invention are illustrated in the accompanying drawings and described and claimed herein.

Figure 1 is a perspective of the device as applied to a mud guard in place on a vehicle body.

Fig. 2 is a detail elevation and partial sectional view of a form of the reshaping dies and means for connecting the same to a support.

Fig. 3 is a plan view of a part of the structure shown in Fig. 2.

Fig. 4 is a perspective of the upper die block.

Fig. 5 is a side elevation of a modified form of the reshaping means as adapted for reshaping the flange of the mud guard.

Fig. 6 is a plan view of the device shown in Fig. 5.

Fig. 7 is a plan view showing a modified form of the upper die constructed and arranged to be adjusted to fit different curvatures of different mud guards.

Fig. 8 is an edge view in the direction of the arrow 8 in Fig. 7.

Fig. 9 is a transverse section on line 9—9 of Fig. 7.

Figs. 10 and 11 show end views of a further modified form of upper and lower dies.

Fig. 12 is a perspective showing a form of the flange reshaping die adapted to be carried in hand and operative without the use of a support.

In the form of the invention shown in Figs. 1 to 4 inclusive the die consists of an upper concave block 2 and a lower convex block 3, the upper block being detachably connected to a set screw 4 that has on its lower end a pivoted washer 5 with its parallel longitudinal edges shaped to interlock with fastening means provided on the upper surface of the block 2.

In the form shown the block has an oblique guide and clamp jaw 6 at its upper part and opposite thereto a nut 7 with a gripping surface 8 these members being complementary to the washer 5 to be interlocked therewith. The nut 7 is turnable about and is clamped by a screw or other fastening means 9 thus enabling the ready interchange of the die member 2 as may be required according to the shape of the mud guard to be reshaped.

The lower die 3 is also removable and replaceable and is provided with a dovetail carrying block 10 to which may be attached an adjusting screw 11. The set screw 4 and the screw 11 are respectively passed through opposed arms 12 and 13 of a yoke frame or C-clamp body 14 that has at its cross end a swivel attachment with a stem 15 having a collar 16 engaging a ring 17 between which and the back of the frame 14 the collar of the stem is turnable but held against longitudinal movement. The stem or trunnion 15 is diametrically perforated and threaded to receive the supporting post or standard 18 the lower end of which is mounted on a suitable base including a connection 19 through which extends a forwardly extending and curved foot 20 to reach around the lower portion of the tire T on a wheel W of the vehicle, the mud guard of which is being repaired. To stabilize the support the fitting 19 is provided with a rearwardly extending foot portion 21.

The outer end of the stem 15 is turned down and screw threaded as at 15' and receives a threaded collar or nut 22 having a lever or handle 23 extending radially therefrom. The inner face of the collar 22 abuts against a washer or ring 24 which in turn bears against a sleeve 25 diametrically oppositely perforated to permit the free passage of the supporting post 18, and the inner end of the sleeve 25 abuts against the retaining collar 17. From this it will be seen that by turning the clamping collar 22 it presses the washer ring 24 against the sleeve 25 which is thrust against the bearing or retaining member 17 while the spindle or stem 15 is drawn in the opposite or outward direction and the parts securely clamped at any desired elevation on the post or standard 18.

When the device of Fig. 1 is arranged in position the upper and lower dies 2—3 are caused to firmly clamp upon opposite faces of the mud guard G and by applying the necessary pressure to the screws 4 and 11 the deformity of the guard is pressed out and it is restored to its original shape.

A form of the reshaping means is shown in Figs. 5 and 6 in which there is secured on the post 18 a sliding part 15ª having a set screw 15ᵇ for securing at desired elevation, and on the opposite side of the member 15ª there is pivoted a C-clamp body 14' having an adjustable jaw 2ª· with an adjusting screw 4ª and the other end of the C-body 14' is provided with a fixed die 3'. These dies, in this case, are designed to be arranged in opposite positions on the inner and outer faces of the flange F of the mud guard G. For the purpose of clearing the usual bead B on the flange the die 3' is spaced above the bottom of the body part 14' to provide clearance for the bead B.

In Figs. 7, 8 and 9 a form of the reshaping mold or die is illustrated and that is especially adapted for adjustment of its several elements to conform to different curvatures of different types of guards, and to secure this the female mold as illustrated comprises a substantial frame or body part 30 that is shown as rectangular in plan and has a downwardly extending flange 30' around its sides forming a shallow chamber in which there is arranged a plurality of sections cooperating to form a mold device.

In this case there are four sections of substantially duplicate form illustrated, each section consisting of a square block 31 having a pivotal connection 32 at one of its corners in the adjacent corner of the flange 30', such pivotal connection preferably being of the ball and socket joint type to provide a substantially universal movement toward and from the body or frame 30 and providing for the lifting and lowering of its innermost corner with respect to the center of the block or body 30. The lower surface of each of the mold sections 31 is concaved and has a spherical surface, the cavity being of greatest depth at the inner corner of the block or section 31 as indicated at 33, Fig. 9. Thus the set of die forming blocks 31 form therefor a spherical concavity the general curvature of which is varied according to the inward or outward movement of the innermost corners of the blocks 31.

The blocks are held in their given adjustment against outward pressure as by respective set screws 34 arranged in pairs for each block, the screws being disposed in each pair adjacent the side inner edges of each die block 31 and preferably intermediately the length of the edge as shown in Fig. 7.

For the purpose of covering the gap or space existing between the contiguous edges of the blocks 31, a cover plate 35 of flexible but durable material is attached, as shown in Fig. 8, to the outer edges or corners of the adjacent pairs of blocks 31, the plate having upturned opposite edges 35' bent around the correspondingly curved edges of the blocks 31, as shown, and which curved edges are held to the blocks by fastening screws 36 which pass through slots 35ª provided in the curved portions 35' of the plate 35 so as to allow necessary play of the secured portions of the plate as the latter changes its shape when applied to the surface of a mud guard to be reshaped by the application of the die.

A further modified form of the reshaping dies is shown in Figs. 10 and 11 wherein the female die comprises a body part 40 having undercut sides 41 forming a chamber that is filled with babbitt or other suitable material 42 the inner surface of which is curved to conform to a given mud guard and which is faced with a substantial wear taking plate 43 that is shown as having flanges laid over the sides 41 of the member 40 and secured thereto as by means of screws 44. A complementary male die 45 is likewise provided with an undercut central chamber or space between side walls 46 and this is filled with babbitt or other suitable material 47 covered by a wear plate or sheet 48 also removably secured to the member 45 as by screws 49. Obviously the die members 10 and 11 may be readily adapted to conform to mud guards of different curvature by the utilization of wear plates 43 and 48 of the desired curvature and the reinforcing or supporting backing as 42 and 47 in the chamber of the mold members.

A still further form of the invention is shown in Fig. 12 in which the structure is of such size and proportions that it may be readily carried in the hand and consists of a frame or body member 50 of generally plane form and having on one face an upwardly extending rib 51 through which is passed a clamp screw 52 having a lever 53 by which it may be turned through the rib 51 which is threaded to take the screw. The inner end of the screw engages a movable clamp jaw or die 54 shown as moved against the adjacent outer face of a flange F of a mud guard the opposite face of which is supported against a block 55 supported against the end flange 56 of the frame 50; the block 55 being spaced above the surface of the member 50 to provide a clearance space for the bead B of the flange F.

This device is capable of being readily applied to the flange at any desired location and set up without the use of the support or post such as shown in Fig. 1.

Various changes may be made without departing from the spirit of my invention as claimed.

What is claimed is:

1. In an apparatus for re-shaping deformed mud guards, a support, a yoke adjustably arranged on said support, oppositely arranged independently operable screw rods mounted in the arms of said yoke, a die pivotally mounted on one of said screw rods, and a co-operating die adjustably mounted on the other screw rod.

2. An apparatus for reshaping deformed mud guards comprising a support, a frame carried by the support and adapted to straddle the mud guard being operated upon, said frame having a bodily swinging movement of its longitudinal axis, and adjustable dies carried by the frame on opposite sides of the mud guard.

3. An apparatus for reshaping deformed mud guards comprising a support, a frame vertically adjustable on the support and adapted to straddle the mud guard being operated upon, said frame having a bodily swinging movement of its longitudinal axis, and adjustable dies carried by the frame on opposite sides of the mud guard.

4. An apparatus for reshaping deformed mud guards comprising a support, a frame vertically adjustable on the support and adapted to straddle the mud guard being operated upon, said frame having a bodily swinging movement of its longitudinal axis, a screw-threaded rod adjustable through each arm of the frame, and removable dies carried by the rods.

5. An apparatus for reshaping deformed mud guards comprising a support, a frame carried by the support and adapted to straddle the mud guard being operated upon, said frame having a bodily swinging movement of its longitudinal axis, and dies, one of which is adjustable relative to the other, carried by the frame on opposite sides of the mud guard.

6. An apparatus for reshaping deformed mud guards comprising a support, a frame vertically adjustable on the support and adapted to straddle the mud guard being operated upon, said frame having a bodily swinging movement of its longitudinal axis, and dies, one of which is adjustable relative to the other, carried by the frame on opposite sides of the mud guard.

7. An apparatus for reshaping deformed mud guards comprising a base support adapted to rest upon the ground, adjacent to the wheel of a vehicle, an upright supporting member projecting from the base support, a yoke adjustably mounted on the upright, arranged to have its open end project inwardly of the plane of the wheel to receive the mud guard while in position on the vehicle, and relatively adjustable guard shaping members operatively associated with the arms of the yoke.

In testimony whereof I have signed my name to this specification.

WILLIAM C. J. GUILFORD.